US010139267B2

(12) United States Patent
Deverell et al.

(10) Patent No.: US 10,139,267 B2
(45) Date of Patent: Nov. 27, 2018

(54) SYSTEMS AND METHODS FOR STORAGE AND ANALYSIS OF PERIODIC WAVEFORM DATA

(71) Applicant: General Electric Company, Schenectady, NY (US)

(72) Inventors: Kevin Brian Deverell, Carson City, NV (US); Matt Benjamin Kalb, Gardnerville, NV (US); Mel Gabriel Maalouf, Minden, NV (US); David John Shafer, Carson City, NV (US); Ryan Gregory Roaldson, Minden, NV (US)

(73) Assignee: General Electric Company, Schenectady, NY (US)

( * ) Notice: Subject to any disclaimer, the term of this patent is extended or adjusted under 35 U.S.C. 154(b) by 781 days.

(21) Appl. No.: 14/151,297

(22) Filed: Jan. 9, 2014

(65) Prior Publication Data
US 2015/0192456 A1    Jul. 9, 2015

(51) Int. Cl.
*G01H 1/00*  (2006.01)
*G05B 23/02*  (2006.01)

(52) U.S. Cl.
CPC ......... *G01H 1/006* (2013.01); *G05B 23/0224* (2013.01)

(58) Field of Classification Search
None
See application file for complete search history.

(56) References Cited

U.S. PATENT DOCUMENTS

| 4,924,418 | A  | * | 5/1990  | Bachman ............. G07C 5/0816 |
|           |    |   |         | 701/32.7 |
| 6,556,956 | B1 | * | 4/2003  | Hunt ................... G05B 19/0421 |
|           |    |   |         | 702/188 |
| 6,801,877 | B2 | * | 10/2004 | Schiltz ................. G01H 1/003 |
|           |    |   |         | 702/183 |
| 2004/0230377 | A1 | | 11/2004 | Ghosh et al. |
| 2010/0280872 | A1 | | 11/2010 | Scholte-Wassink |
| 2012/0274473 | A1 | * | 11/2012 | Heda .................... G01H 1/006 |
|           |    |   |         | 340/683 |

(Continued)

FOREIGN PATENT DOCUMENTS

WO    2013127958 A1    9/2013

OTHER PUBLICATIONS

PCT Search Report and Written Opinion issued in connection with corresponding Application No. PCT/US2014/069448 dated Mar. 26, 2015.

*Primary Examiner* — John Kuan
(74) *Attorney, Agent, or Firm* — Mintz Levin Cohn Ferris Glovsky and Popeo, P.C.

(57) ABSTRACT

A method includes collecting a data for a time from sensors to a fixed monitoring system. The fixed monitoring system is fixedly coupled to a turbo-machinery and the sensors are configured to monitor the turbo-machinery, also, the time comprises at least one week. The method also includes recovering the data by coupling a portable machinery monitor to the fixed monitoring system and retrieving the data into the portable machinery monitor. The method also includes analyzing the data to determine one or more machinery conditions. The analyzing the data comprises analyzing the data via the portable machinery monitor, an external system, or any combination thereof.

20 Claims, 4 Drawing Sheets

(56) References Cited

U.S. PATENT DOCUMENTS

2013/0268241 A1* 10/2013 Das .................. G06F 11/00
702/185
2013/0326383 A1* 12/2013 Gatti ................ G01H 1/003
715/771

* cited by examiner

SYSTEMS AND METHODS FOR STORAGE AND ANALYSIS OF PERIODIC WAVEFORM DATA

BACKGROUND

The subject matter disclosed herein relates to systems and methods for data monitoring and analysis of waveform data.

In many applications where machinery is used, the machinery may be monitored for environmental circumstances, and operating conditions of the machinery and components of the machinery. For example, sensors may be placed at various locations throughout the machinery and machinery components in order to monitor the conditions at those locations. Collecting data from the sensors can be difficult due to the noise caused by the machinery.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes collecting a data for a time from sensors to a fixed monitoring system. The fixed monitoring system is fixedly coupled to a turbo-machinery and the sensors are configured to monitor the turbo-machinery, also, the time comprises at least one week. The method also includes recovering the data by coupling a portable machinery monitor to the fixed monitoring system and retrieving the data into the portable machinery monitor. The method also includes analyzing the data to determine one or more machinery conditions. The analyzing the data comprises analyzing the data via the portable machinery monitor, an external system, or any combination thereof.

In a second embodiment, a system includes a fixed monitoring system that includes a data collection circuitry having a first memory and a first processor and a first communications port. The first processor is configured to collect data from a machinery for a time of at least one week, and to store the data in the memory. The fixed monitoring system also includes a portable machinery monitor system having a second memory and a second processor. The system also includes a second communications port. The first or the second processor is configured to communicate the data through the first and the second communications from the first memory into the second memory.

In a third embodiment, a system includes a portable machinery monitor system having a first memory and a first processor. The system also includes a first communications port. The first processor is configured to communicate with a fixed monitoring system to receive a data collected by the fixed monitoring system, and to analyze the data to derive a vibration.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
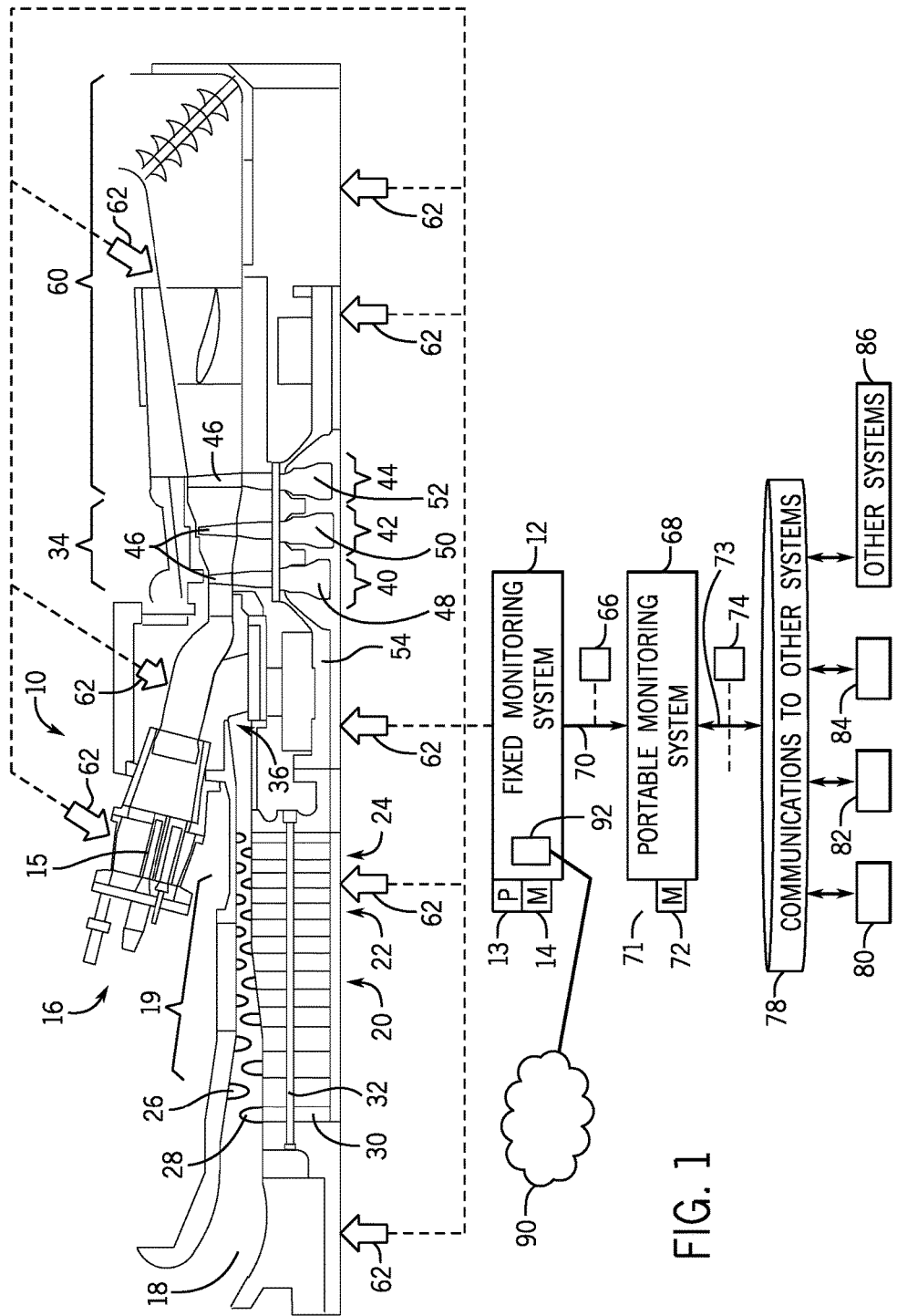
FIG. 1 is an embodiment of a turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In some industrial environments, certain turbo-machinery (e.g., turbines, generators, compressors, motors, pumps, fans, gearboxes and the like) may be used in a variety of industrial processes, such as manufacturing processes, oil & gas production and processing, power production, chemical processing, and so on. Such turbo-machinery may be monitored to provide, for example, historical data of operations and environmental conditions of the turbo-machinery useful in analysis of degradation and/or fault detection. The monitoring may be provided by a monitoring specialist as part of a regular maintenance cycle. For example, the maintenance specialist may communicatively couple an equipment analysis tool to the turbo-machinery and observe the turbo-machinery while in operations. The monitoring specialist may then analyze the turbo-machinery in situ. In another operating mode, the turbo-machinery may be communicatively coupled to a remote observation system which may constantly gather and/or analyze data. However, providing a dedicated remote observation system (e.g., real time observation) or providing for a monitoring specialist at specific times may be inefficient and costly.

The techniques described herein provide for systems and methods that may be retrofitted to turbo-machinery to monitor existing equipment (e.g., turbo-machinery) for a desired period to time (e.g., between 1 and 2 weeks, between 1 and 4 weeks, between 30 and 120 days, or more). The monitoring device may be permanently mounted to the equipment and include a 2 channel monitor which may protect the equipment from failures due to, for example, undesired vibration. The affixed monitor would store periodic vibration data over a desired period of time. This period of time can be pre-scheduled by the user through a web interface or changed using a portable data collector and monitoring system suitable for coupling to the affixed monitor. The permanently mounted monitoring system may also alter the amount of data collected based on measured or processed machinery conditions. Once the monitor is operational, the user may recover data including historic events (e.g., undesired vibration events) and periodic sensor data using the portable data collector. In one embodiment, the portable data collector and monitoring system may be coupled to the fixed monitoring system through an Ethernet cable, a universal serial bus (USB) cable, a serial cable, a wireless connection (e.g., Bluetooth™, Zigbee®. Wifi), and/or through transfer via a flashdrive, secure digital (SD) card, and the like. By combining a fixed monitoring system with a portable unit suitable for downloading stored data, the techniques described herein may improve data analysis and collection by more flexibly and efficiently providing for data acquisition and system monitoring.

It may be useful to describe a turbo-machinery system that may advantageously include the techniques described herein. With the foregoing in mind and turning now to FIG. 1, an embodiment of a turbo-machinery system 10 is illustrated. Certain machinery, such as the turbo-machinery system 10, may include various components as further described below, that may be monitored during operations. For example, a fixed monitoring system 12 may be communicatively coupled to the turbo-machinery system 10 and used to monitor a variety of parameters, as described in more detail below. The fixed monitoring system 12 may include a processor 13 useful in executing computer instructions and a memory 14 useful in storing data and computer instructions. The fixed monitoring system 12 may be disposed on the turbo-machinery system 10 and used to store data over a desired time period.

During operation of the turbo-machinery system 10, a fuel such as natural gas or syngas, may be routed to the turbo-machinery system 10 through one or more fuel nozzles 15 into a combustor 16. Air may enter the turbo-machinery system 10 through an air intake section 18 and may be compressed by a compressor 19. The compressor 19 may include a series of stages 20, 22, and 24 that compress the air. Stage 20 may be a low pressure stage, stage 22 may be an intermediate pressure stage, and stage 24 may be a high pressure stage. Each stage includes one or more sets of stationary vanes 26. Each stage includes blades 28 that rotate to progressively increase the pressure to provide compressed air. The blades 28 are attached to rotating wheels 30 connected to a shaft 32.

The compressed discharge air from the compressor 19 exits the compressor 19 through a diffuser section 36 and is directed into the combustor 16 to mix with the fuel. For example, the fuel nozzles 15 inject fuel into compressed air in the combustor 16 in a suitable ratio for optimal combustion, resulting in minimal emissions, minimal fuel consumption, and maximum power output. In certain embodiments, the turbo-machinery system 10 may include multiple combustors 16 disposed in an annular arrangement. Each combustor 16 may direct hot combustion gases into a turbine 34.

In the depicted embodiment, the turbo-machinery system 10 includes a turbine section 34 having three separate stages 40, 42, and 44. The stage 40 is a high pressure stage, stage 42 is an intermediate pressure stage, and stage 44 is a low pressure stage. Each stage 40, 42, and 44 includes a set of blades or buckets 46 coupled to a respective rotor wheel 48, 50, and 52, which are attached to a shaft 54. As the hot combustion gases cause rotation of turbine blades 46, the shaft 54 rotates to drive the compressor 19 and any other suitable load, such as an electrical generator. Eventually, the turbo-machinery system 10 diffuses and exhausts the combustion gases through an exhaust section 60.

The turbine system may also include a plurality of sensors 62 configured to monitor a plurality of engine parameters related to the operation and performance of the gas turbine engine 10. The sensors may include, for example, inlet sensors and outlet sensors positioned adjacent to, for example, the inlet and outlet portions of the turbine 16, sensors 62 positioned to sense the various stages (e.g., 20, 22, and/or 24) of the compressor 19. The inlet sensors and outlet sensors 62 may measure a variety of data types. For example, environmental conditions, such as ambient temperature and ambient pressure, flow data, or chemical data. The sensors 62 may also measure a plurality of engine parameters related to the operation and performance of the turbo-machinery system 10, such as, exhaust gas temperature, rotor speed, engine temperature, engine pressure, gas temperature, engine fuel flow, exhaust flow, vibration, clearance between rotating and stationary components, compressor discharge pressure, gas composition such as pollution (e.g., carbon monoxide, nitrogen oxides, carbon dioxide, particulate count), and turbine exhaust pressure.

As such, the sensors 62 may include, but are not limited to, thermocouples, proximity sensors, eddy current sensors, ultrasonic sensors, velocity sensors, vibration sensors, pressure sensors, clearance sensors, accelerometers, gyroscopes, chemical sensors, optical sensors, and the like. The plurality of sensors 62 may also be configured to monitor engine parameters related to various operational phases (e.g., start-up, steady state, transient state, and shut down) of the turbo-machinery system 10. Measurements taken by the plurality of sensors 62 may be transmitted as electrical signals to the fixed monitoring system 12. The fixed monitoring system 12 may then store the sensor signals for later upload to a different system (e.g., portable monitoring system 68). The sensors 62 may support high resolution data collection such that small or rapid changes may be detected, stored, and reported. For example, the data may be collected in a range between 0.5 nanoseconds to 100 milliseconds, 10 nanoseconds to 1 millisecond, 100 nanoseconds to 750 nanoseconds, or any other high-resolution periodic data detection.

For example, the fixed monitoring system 12 may derive keyphasor measurements (e.g., phase relationship between vibration components and timing marks on the shaft 32 and/or 54), relative vibration (e.g., using proximity probes), axial positions, radial positions, casing velocity, casing acceleration, temperatures, differential expansion/case expansion, overspeed detection, rotor wheel 48, 50, 52 acceleration, actuator positions (e.g., valve positions, linear actuator positions), shaft 32 and/or 54 eccentricity, rolling element bearing activity monitor (REBAM®) data, vibration measurements (e.g., axial vibration, radial vibration), speed measurements, clearance measurements (e.g., distance between a rotating component and a stationary component), pressure measurements, flow measurements, or any combination thereof, or any similar measurements. Accordingly, operating conditions may be derived, including normal operations, abnormal operations, and so on.

In the depicted embodiment, data 66, including raw sensor 62 data, is provided to a portable monitoring system 68 by using a two-way communication data flow 70. In another embodiment, the data flow 70 may be one-way. The two-way data flow 70 may use a communications conduit such as a backplane communications bus, a fiber optic cable, an electrically-conductive cable, and the like. The data 66 may include substantially all of the signals produced by the sensors 62, e.g., raw data. That is, the data 66 may include sensor 62 signals indicative of system 10 conditions. In one embodiment, the portable monitoring system 68 may then use raw data 66 to derive measurements, conditions, parameters, alarms, alerts, and so on. These system 68 derivations may include, but are not limited to keyphasor measurements (e.g., phase relationship between vibration components and timing marks on the shaft 32 and/or 54), relative vibration (e.g., using proximity probes), axial positions, radial positions, casing velocity, casing acceleration, temperatures, differential expansion/case expansion, overspeed detection, rotor wheel 48, 50, 52 acceleration, actuator positions (e.g., valve positions, linear actuator positions), shaft 32 and/or 54 eccentricity, rolling element bearing activity monitor (REBAM®) data, vibration measurements (e.g., axial vibration, radial vibration), speed measurements, clearance measurements (e.g., distance between a rotating component and a stationary component), pressure measurements, flow measurements, or any combination thereof.

In another embodiment, the data 66 may include some or substantially all of the derived measurements provided by the fixed monitoring system 12, such as the keyphasor measurements, relative vibration, axial positions, radial positions, casing velocity, casing acceleration, temperatures, differential expansion/case expansion, overspeed detection, rotor wheel 48, 50, 52 acceleration, actuator positions (e.g., valve positions, linear actuator positions), shaft 32 and/or 54 eccentricity, rolling element bearing activity monitor (REBAM®) data, vibration measurements (e.g., axial vibration, radial vibration), speed measurements, clearance measurements (e.g., distance between a rotating component and a stationary component), pressure measurements, flow measurements, or any combination thereof. The portable monitoring system 68 may include a processor 71 suitable for executing computer instructions and a memory 72 useful in storing data and computer instructions.

The portable monitoring system 68 may then upload a data 74 to other systems 78 through a two-way communication 73. In another embodiment, the data flow 73 may be one-way. The communications to other systems 78 may include a communications network more optimized to analyze the raw data collected by the sensors 62. In this manner, a math analytics program 80, a logger/database 82, a keyphasor 84, and/or other systems 86 may accept the data from the portable monitoring system 68 and use the data 74, which may include measurements derived from the sensors 62, for further analysis. Likewise, the systems 80, 82, 84, and/or 86 may communicate the data 66, 74 for example, to request specific derived measurements through the data 68, of system 10 parameters, and so on.

The fixed monitoring system 12 may also be directed in some respects by instructions based in a digital cloud 90. The cloud 90 represents aggregation of access and/or instruction methods remote from the system 12. For example, the cloud 90 may include computers connected to the internet, a local area network, a wireless local network, other network, or other digital controller. Instructions based in the cloud 90 may instruct the fixed monitoring system 12 through a wireless communications module 92. Thus, operations such as when to collect data from the sensors 62, which sensors 62 to turn on during a given time period, how often the sensors 62 collect data (i.e., the frequency of collection), which data type to collect, or other condition-based regulation of the sensors 62, or any combination thereof may be controlled without visiting the fixed monitoring system 12.

Figure 2:
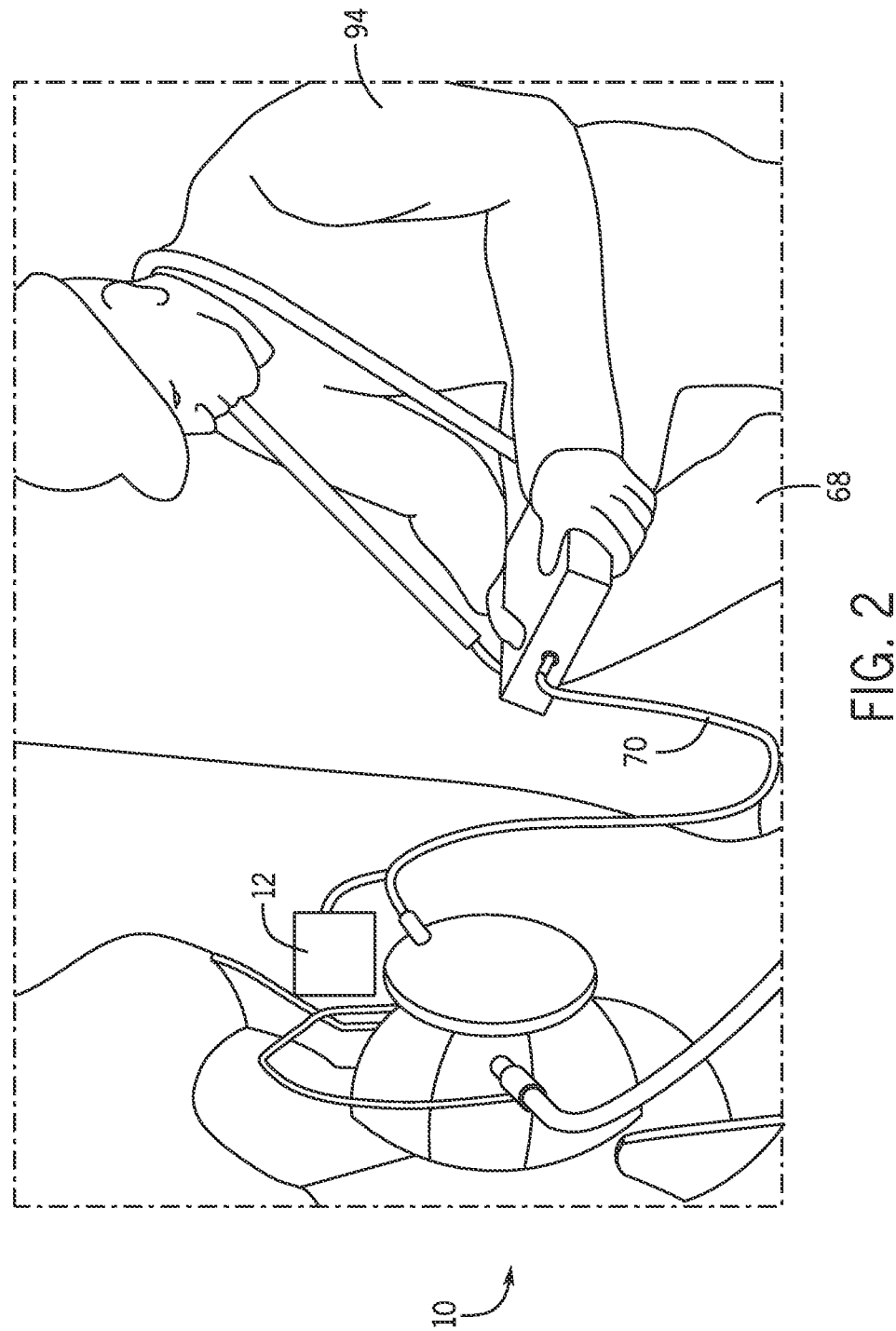
FIG. 2 is an embodiment of the portable monitoring system being used in operation by an operator.

FIG. 2 is an embodiment of the portable monitoring and data analysis system 68 being used in operation by an operator (e.g., monitoring specialist) 94. The portable monitoring system 68 is connected to the fixed monitoring system 12 through the two-way connection 70. As illustrated, the portable monitoring unit 68 is carried by the operator 94 who may travel between multiple fixed monitoring systems 12 that monitor multiple machinery systems 10. The operator 94 may travel to a particular turbo-machinery system 10 once every week, few weeks, months, or longer to collect the data 66 from the fixed monitoring system 12. The operator 94 may use the portable monitoring system 68 connected to the fixed monitoring system 12 to access the raw outputs of the sensors 62. When the operator 94 accesses the raw signals of the sensors 62, the portable monitoring system 68 records and/or analyzes data as the turbo-machinery system 10 operates. The portable monitoring system 68 may thus perform diagnostic calculations and operations on live data. The portable monitoring system 68 may include sensors such as accelerometer, velocity, displacement, current, voltage output, and laser sensor. The portable monitoring system 68 may also include 2-channel or 4-channel sensor input with wide measurement range (e.g., 1000 g. 25,00 mm/s, 2500 mm). In one embodiment, the portable monitoring system 68 is a Scout 100/140® available from Bently Nev. The portable monitoring system 68 also connects to the fixed monitoring system 12. Connecting to the fixed monitoring system 12 may be accomplished via a local area network, a wide area network, a wireless network, or any combination thereof, to update a parameter of the fixed monitoring system 12. The fixed monitoring system 12 stores operating data received from the sensors 62 as explained above with regard to FIG. 1. The operator 94 evaluates and controls what data is stored on the fixed monitoring system 12. For example, the operator 94 might retrieve data 66 stored on the fixed monitoring system 12 and clear the stored data 66 as part of each visit. In other instances, the operator 94 may leave portions of the data 66 stored on the fixed monitoring system 12 between visits.

By providing for storage suitable for storage of data at desired time periods, the fixed monitoring system 12 may enable data acquisition at real-time or near real-time levels without having a dedicated remote observation system that is always connected to the turbo-machinery. Indeed, data may be sampled or otherwise acquired by the fixed monitoring system 12 at a frequency of 500 Hz, 1 MHz, 10 MHz or more at a resolution of 8, 16, 24, 32, 64 bits or more and subsequently stored. The operator 94 may retrieve the data stored in the fixed monitoring system 12 by communicatively coupling the portable monitoring system 68 to the fixed monitoring system 12. The portable monitoring system 68 may then analyze the retrieved data in situ without waiting extra time for data acquisition. Additionally or alternatively, the retrieved data may be analyzed at a later time.

Figure 3:
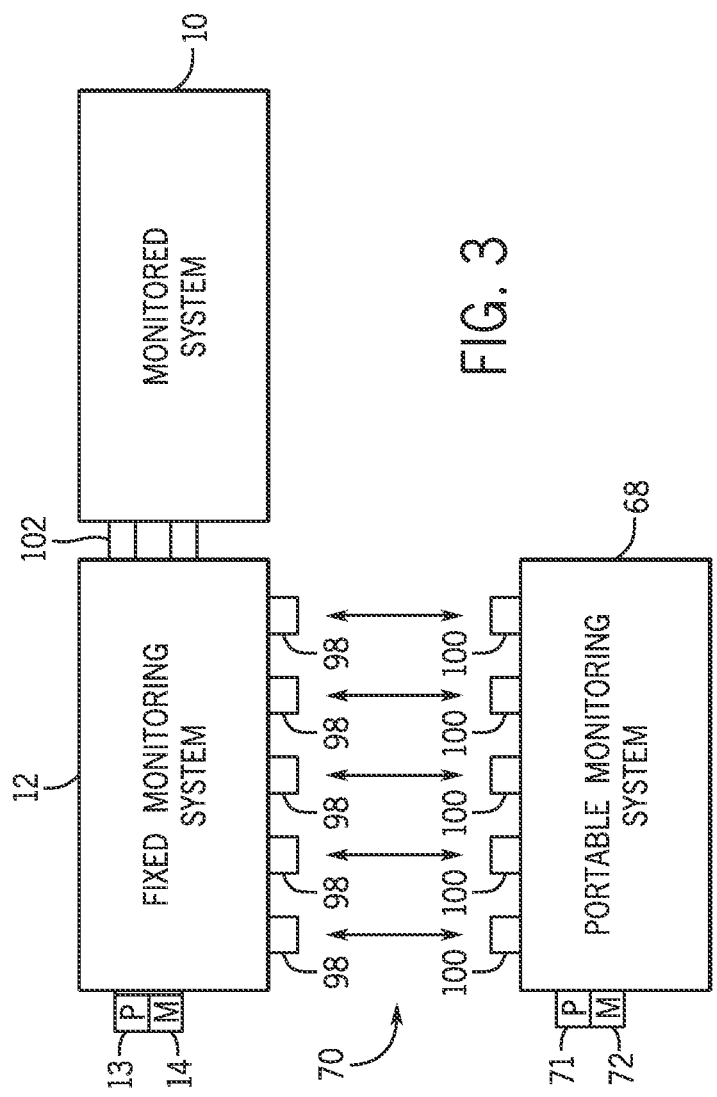
FIG. 3 illustrates a schematic diagram of an embodiment of the fixed monitoring system and the portable monitoring system of FIG. 1.

FIG. 3 illustrates a schematic diagram of an embodiment of the fixed monitoring system 12 affixed to the monitored system 10, and the portable monitoring system 68 of FIG. 1 communicatively coupled to the fixed monitoring system 12. The fixed monitoring system 12 includes the processor 13 and the memory 14 as described above. The memory 14 may include any type of digital or non-digital storage, or combination of types of storage. For example, the memory 14 may include primarily non-volatile memory such as flash memory or random access memory (RAM). The memory 14 may also include magnetic disks or tape, zip drives, thumb drives, or optical storage media. Furthermore, the fixed monitoring system 12 may employ combinations of these types of memory in order to store the data received from the sensors 62 on the memory 14.

The fixed monitoring system 12 includes at least one of a number of communication ports 98. The illustrated embodiment includes five ports 98, but other embodiments may include more or fewer ports 98. The ports 98 include a number of types of communication ports such as universal serial bus (USB) ports, serial ports, VGA ports, PPTP ports, DNS ports, NTP ports, Ethernet ports, Firewire ports, or other communications ports. The ports 98 may also include wireless ports, such as Wifi (e.g., IEEE 802.11x), Bluetooth™, Zigbee®, and the like. The portable monitoring system 68 also includes correlating communication ports 100 that allow for any of the ports 98 from the fixed monitoring system 12 to communicate via the two-way communication 70. The fixed monitoring system 12 is fixedly connected to the monitored turbo-machinery system 10. The permanent connection 102 may include any suitable connection means such as welding, bolting, magnetic attachment, chemical adhesive, a combination thereof, or other attachment techniques. The sensors 62 may also be fixed to the machinery that is being monitored. The sensors 62 are thus attached in similar ways to the turbo-machinery system 10.

Figure 4:
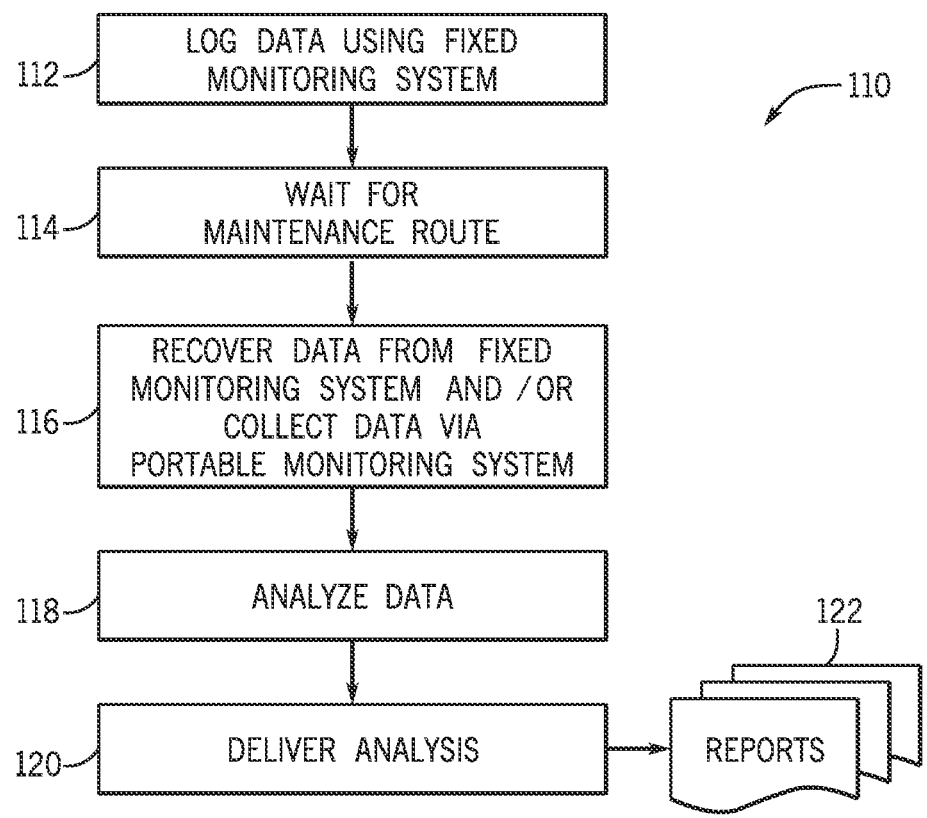
FIG. 4 is a flowchart of an embodiment of a method for generating maintenance reports about the turbine system of FIG. 1.

FIG. 4 is a flowchart of an embodiment of a process for generating maintenance reports based on data capture and analysis for the turbo-machinery system 10 of FIG. 1. The process 110 begins, at block 112, with the fixed monitoring system 12 logging data collected by the sensors 62 installed within the turbo-machinery system 10. The fixed monitoring system 12 may collect all points of data from all the sensors 62, or may be instructed to collect only some points of data from certain sensors 62. The instructions for logging the data as well as for how long to store the data may be supplied to the fixed monitoring system 12 from the cloud 90. The instructions may direct the fixed monitoring system 12 to log data more often during start-up and shut down of the turbo-machinery system 10, for example. Other instructions may direct the fixed monitoring system 12 to continuously log data from all sensors 62 until storage is full. Data may be logged based on the condition of the system and the availability of storage on the fixed monitoring system 12. For example, if the turbo-machinery system 10 recently went through servicing, or if the amount of storage is low, the fixed monitoring system 12 may be instructed not to log data as often.

At block 114, the process 110 includes waiting for the maintenance route. A maintenance route may be followed by the operator 94, for example, every 90 days, or at any other time period. During the waiting period between maintenance visits, the fixed monitoring system 12 continues to log data as instructed by the portable monitoring system 68, or as instructed through the cloud 90. Until the wait for the maintenance route is over, the fixed monitoring system 12 does not transfer the data, but stores the data for download. Accordingly, transmission components and energy used for transmitting data may be minimized. At block 116, the process 110 includes recovering or retrieving stored data from the fixed monitoring system 12 and/or collecting new data via the portable monitoring system 68. For example, the operator 94 brings the portable monitoring system 68 along the maintenance route and connects the portable monitoring system 68 to the fixed monitoring system 12 with the communication ports 98, 100. The fixed monitoring system 12 then transfers the data to the portable monitoring system 68. Additionally, the portable monitoring system 68 may connect directly to the sensors 62 and collect new data without it being stored by the fixed monitoring system 12.

The portable monitoring system 68 may also, at block 118, analyze the stored and/or new data for patterns or indications of operation conditions of the turbo-machinery system 10. The operator 94 may analyze the data collected either from the fixed monitoring system 12 or from the sensors 62 and subsequently collect additional data from the sensors 62 based on the analysis. For example, if the analyzed data from the fixed monitoring system 12 indicates an increase in vibration from a section of the turbo-machinery system 10, the operator 94 may instruct the portable monitoring system 68 to collect more data from that section to confirm or deny the vibration condition. Furthermore, at block 120, the process 110 includes delivering the analysis. Delivery may include upload to networks such as the systems 80, 82, 84, 86 indicated in FIG. 1. The networks 80, 82, 84, 86 may determine whether a notification should be sent to maintenance personnel. For example, if an increase of vibration is analyzed and determined to be from wear on the shaft 32, then the networks 80, 82, 84, 86 will notify the shaft 32 maintenance department. The portable monitoring system 68 may generate reports 122 that organize the analyzed data into a readily understood format. These reports may then be used to plan and adjust a servicing schedule for the turbo-machinery system 10. The portable system 68 may also prepare the reports 122 in the field and deliver them to interested parties.

Technical effects of the invention include the turbo-machinery system 10 with sensors 62 that monitor and detect indications of operation. The sensors 62 deliver the detected conditions to either the fixed monitoring system 12 or the portable monitoring system 68, or both. The fixed monitoring system 12 contains a memory 14 that stores the conditions and signals from the sensors 62. The memory 14 may be configured to store high resolution signals for a week, a month, a year, or longer. The portable monitoring system 68 is assigned to monitor several gas turbine systems and thus is present only when a maintenance schedule is desired. The portable monitoring system 68 connects to the fixed monitoring system 12 when it is present and recovers the stored data. The portable monitoring system 68 also analyzes the data to generate data that is easy to read, and/or identifies likely maintenance issue for the turbo-machinery system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
  collecting a collected data for a time from sensors to a fixed monitoring system, wherein the fixed monitoring system is fixedly mechanically coupled to a turbomachinery at a turbomachinery site and the sensors are configured to monitor the turbomachinery, wherein the time comprises at least one week;
  coupling a portable machinery monitor located at the turbomachinery site to the turbomachinery via a second sensor to receive a live sensor data related to a turbomachinery condition;

coupling one or more communications ports of the portable machinery monitor located at the turbomachinery site to one or more second communications ports of the fixed monitoring system as part of a schedule corresponding to the time and retrieving the collected data from the fixed monitoring system in conjunction with the schedule upon conclusion of the time via the portable machinery monitor when the portable machinery monitor is coupled to the fixed monitoring system at the turbomachinery site; and analyzing the collected data and the live sensor data at the turbomachinery site to determine one or more turbomachinery conditions via the portable machinery monitor while the portable machinery is coupled to the turbomachinery.

2. The method of claim 1, wherein the collected data comprises a measured turbomachinery data, wherein the measured turbomachinery data comprises a vibration data, a high resolution data, a waveform data, a pressure data, a temperature data, an acceleration data, a voltage, a current, a capacitance, a machinery condition measurement, or a combination thereof.

3. The method of claim 1, comprising connecting to the fixed monitoring system via a local area network, a wide area network, a wireless network, or any combination thereof, and updating a parameter of the fixed monitoring system.

4. The method of claim 3, wherein the parameter comprises the time, a data type, a subset of the sensors, a frequency of collection, or any combination thereof.

5. The method of claim 4, wherein the data type comprises vibration data, pressure data, flow data, chemical data, or any combination thereof.

6. The method of claim 1, comprising fixedly coupling a fixed sensor of the fixed monitoring system to the turbomachinery via a weld, a fastener, a magnet, a chemical adhesive, or any combination thereof.

7. The method of claim 1, wherein the time is determined by a maintenance schedule of the turbomachinery as the schedule.

8. The method of claim 1, comprising delivering the one or more of the turbomachinery conditions to a selected entity.

9. The method of claim 1, comprising collecting a sensor subset of data during turbomachinery operations from the sensors via the portable machinery monitor by selecting one or more of the sensors to collect the sensor subset of data from based at least in part on the one or more of the turbomachinery conditions.

10. A system, comprising:
a fixed monitoring system comprising:
a data collection circuitry having a first memory and a first processor; and
a first communications port, wherein the first processor is configured to collect a collected data from at least one sensor of a machinery while the fixed monitoring system is mechanically coupled to the machinery at a machinery site for a time of at least one week, and to store the collected data in the first memory; and
a portable machinery monitor system comprising:
a second memory and a second processor; and
a second communications port, wherein the first processor is configured to communicate the collected data to the portable machinery monitor system through the first communications port to the second communications port from the first memory into the second memory as part of a schedule corresponding to the time whereby the portable machinery monitor system is located at the machinery site and coupled to the fixed monitoring system in conjunction with the schedule upon conclusion of the time, wherein the portable machinery monitor system is located at the machinery site and coupled to the machinery monitor the machinery via a second sensor to receive a live sensor data related to a machinery condition, and wherein the second processor is configured to analyze, at the machinery site, the collected data and the live sensor data to determine one or more machinery conditions while the portable machinery monitor system is coupled to the machinery.

11. The system of claim 10, wherein the second processor is configured to analyze the collected data to derive a vibration, a keyphasor, a relative vibration, axial positions, radial positions, casing velocity, casing acceleration, temperatures, differential expansion/case expansion, overspeed detection, rotor wheel acceleration, actuator positions, shaft eccentricity, rolling element bearing activity monitor data, vibration measurements, speed measurements, clearance measurements, pressure measurements, flow measurements, or any combination thereof.

12. The system of claim 10, wherein the fixed monitoring system comprises a communications circuitry comprising a third port, and wherein the first processor is configured to connect with an external system via a local area network, a wide area network, a wireless network, or any combination thereof, and to update a parameter of the fixed monitoring system.

13. The system of claim 10, wherein the fixed monitoring system comprises a user interface, and wherein the first processor is configured to update a parameter of the fixed monitoring system based on an input into the user interface.

14. The system of claim 10, wherein the at least one sensor is configured communicate the collected data to the fixed monitoring system.

15. The system of claim 14, wherein the at least one sensor comprises a vibration sensor, a keyphasor sensor, relative vibration, axial positions, radial positions, casing velocity, casing acceleration, temperatures, differential expansion/case expansion, overspeed detection, rotor wheel acceleration, actuator positions, shaft eccentricity, rolling element bearing activity monitor data, vibration measurements, speed measurements, clearance measurements, pressure measurements, flow measurements, or any combination thereof.

16. The system of claim 10, wherein the second processor is configured to collect data from the machinery.

17. A system, comprising:
a portable machinery monitor system comprising:
a first memory and a first processor; and
a first communications port, wherein the first processor is configured to be coupled to a second communications port of a fixed monitoring system mechanically coupled to a machinery at a machinery site in order to receive a collected data collected from at least one sensor of the machinery for a time comprising at least one week by the fixed monitoring system as part of a schedule corresponding to the time whereby the portable machinery monitor system is located at the machinery site and coupled to the fixed monitoring system system at the in conjunction with the schedule upon conclusion of the time, wherein the portable machinery monitor system is located at the machinery site and coupled to the machinery to monitor the machinery via a second sensor to receive a live sensor data related to a machinery condition, and wherein the first processor is configured to analyze, at the machinery site, the collected data and the live sensor data to derive one or more machinery conditions while the portable machinery monitor system is coupled to the machinery.

18. The system of claim 17, wherein the portable machinery monitor system is configured to analyze the collected data derive a keyphasor, axial positions, radial positions, casing velocity, casing acceleration, temperatures, differential expansion/case expansion, overspeed detection, rotor wheel acceleration, actuator positions, shaft eccentricity, rolling element bearing activity monitor data, vibration measurements, speed measurements, clearance measurements, pressure measurements, flow measurements, or any combination thereof.

19. The system of claim 17, wherein the portable machinery monitor system comprises an accelerometer, a velocity sensor, a displacement sensor, a current sensor, a voltage output sensor, a laser sensor, or any combination thereof.

20. The system of claim 17, wherein the portable machinery monitor system comprises 2-channel sensor input, 4-channel sensor input or any combination thereof with wide measurement range.

* * * * *